United States Patent [19]

de Agudelo et al.

[11] Patent Number: 4,751,210

[45] Date of Patent: Jun. 14, 1988

[54] REGENERATION OF AN IRON BASED NATURAL CATALYST USED IN THE HYDROCONVERSION OF HEAVY CRUDES AND RESIDUES

[75] Inventors: M. M. Ramirez de Agudelo, Los Teques; José M. Larrauri Derteano, San Antonio de Los Altos; Julio Krasuk, Los Teques, all of Venezuela

[73] Assignee: Intevep, S.A., Caracas, Venezuela

[21] Appl. No.: 52,403

[22] Filed: May 21, 1987

[51] Int. Cl.$^4$ .................. B01J 23/94; B01J 38/16; C10G 47/04; C10G 11/04
[52] U.S. Cl. ............................... 502/51; 208/112; 208/124; 502/38; 502/41
[58] Field of Search .................. 502/51, 52, 38, 41, 502/516; 208/52 CT, 121-124, 112

[56] References Cited

U.S. PATENT DOCUMENTS

| | | | |
|---|---|---|---|
| 1,832,217 | 11/1931 | Joseph | 502/51 |
| 3,264,209 | 8/1966 | Files, II et al. | 208/124 |
| 3,755,202 | 8/1973 | Katsobashivili et al. | 502/51 |
| 4,325,812 | 4/1982 | Fujimori et al. | 208/121 |
| 4,678,557 | 7/1987 | Rodriguez et al. | 208/121 |

Primary Examiner—Paul E. Konopka
Attorney, Agent, or Firm—Bachman & LaPointe

[57] ABSTRACT

A process for regenerating a spent, naturally occurring catalyst characterized by an iron content of about 10 to 70 wt. % as metal comprises contacting the spent catalyst with a mixture of water vapor and air in a water vapor/air ratio of between 1:1 to 20:1 at a flow rate of about 0.1 to 50 l/min., a temperature of about 200° to 700° C., a pressure of about 0.3 to 80 atmospheres for a time of about 0.1 to 20 hours so as to obtain a regenerated catalyst having a crystallinity value of about 1.0 to 6.5.

13 Claims, 1 Drawing Sheet

CATALYTIC ACTIVITY VS CRYSTALLINITY

□ LIQUID YIELD
○ GAS YIELD
+ COKE CONTENT ON CATALYST

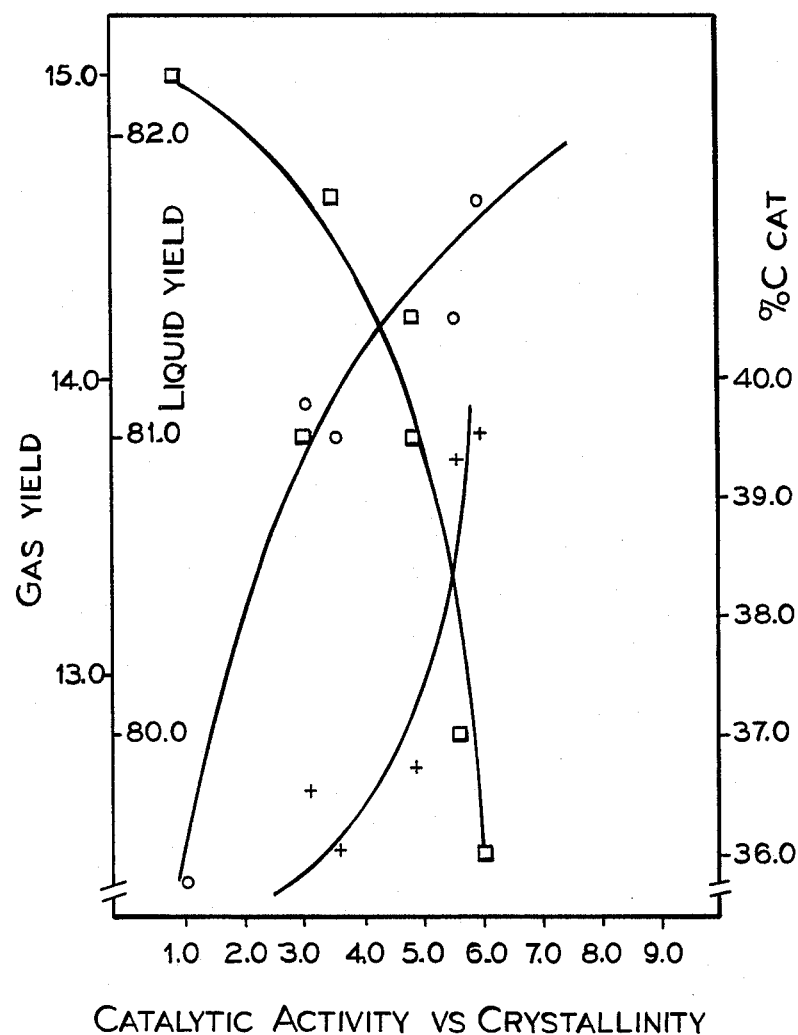
CATALYTIC ACTIVITY VS CRYSTALLINITY
□ LIQUID YIELD
○ GAS YIELD
+ COKE CONTENT ON CATALYST

REGENERATION OF AN IRON BASED NATURAL CATALYST USED IN THE HYDROCONVERSION OF HEAVY CRUDES AND RESIDUES

BACKGROUND OF THE INVENTION

The present invention is drawn to a process for regenerating a spent, naturally occurring catalyst and, more particularly, a naturally occurring catalyst having an iron content of from about 10 to 70 wt.% as metal wherein said catalyst has been poisoned and deactivated by the deposition thereon of carbon and metals as a result of the hydroconversion of heavy hydrocarbon feedstocks with a fresh catalyst.

Heretofore there have been known in the art many processes for regenerating catalysts which have been deactivated due to carbon deposition on the catalyst during the hydroconversion of hydrocarbon feedstocks. Typical prior art patents include U.S. Pat. Nos. 2,640,009, 3,755,202, 4,007,131 and 4,026,821. These prior art patents disclose regenerating processes for removing carbon from the deactivated catalyst which consists of burning off the carbon deposits by blowing oxygen in a diluent gas environment over the catalyst at elevated temperatures. Suitable diluent gases disclosed in the prior art for use in the foregoing processes include nitrogen, flue gas and steam. These particular processes dealt only with catalyst deactivation due to carbon deposition. The spent catalysts subjected to the foregoing regeneration process were generally used in the hydroprocessing or the hydroconversion of substantially metal-free feedstocks such as napthas and gas oils. The difference between the processes of the above-identified prior art patents generally involved the type of equipment used, number of stages and the ranges of operating conditions. For example, U.S. Pat. No. 4,007,131 discloses a two step method wherein initially a gas mixture containing about 0.1 to 4 volume percent of oxygen is passed over the spent catalyst at a temperature of about 315° to 650° C., a pressure of greater than 100 psig and a space velocity of higher than 50 LHSV. After the initial step the oxygen concentration was increased to up to 10 volume percent at increasing temperatures. U.S. Pat. No. 4,026,821 discloses a cylindrical shell for supporting the catalyst during regeneration. The catalysts regenerated by the methods of the foregoing patents were catalysts which consist of Group VI, Group VII or Group VIII metals or mixtures thereof on refractory supports. These patents did not deal with the poisoning of catalysts due to metal deposition thereon.

There are also known processes in the prior art for regenerating hydrotreatment and hydroconversion catalysts which have been deactivated by both metal and carbon deposition. Typical of these processes are those disclosed in U.S. Pat. Nos. 4,089,806, 4,122,000, 4,234,452 and 4,454,240. The catalysts regenerated by these processes are catalysts comprising Group VI and Group VIII metals in combination which are supported on inorganic oxide carriers. In the processes disclosed in the foregoing patents, the metal contaminants are removed by employing chemicals prior to carbon burn-off in order to avoid release of sulphur dioxide and sulphurization of the carrier support which would result in damage to the physical properties of the catalyst, namely, pore volume, surface area and crushing strength. These procedures known in the prior art fail to oxidize the metal sulphides formed on the catalysts during operation. This is generally helpful since metal sulphides are generally less soluble than oxides and, therefore, when vanadium is chemically extracted from the spent catalyst the Group VI and Group VIII metals can selectively remain on the matrix. In addition to the foregoing, U.S. Pat. No. 4,182,747 as well as other above-identified patents disclose processes for removing metal contaminants before carbon burning by acid washing of the spent catalyst.

As previously noted the foregoing processes are designed to be used with catalysts containing Group VI and Group VIII metal combinations on refractory supports. These catalysts are very expensive to manufacture. As a result the costly regenerating processes noted above are economical to apply to these catalysts; however, these processes would not be cost efficient as applied on the inexpensive naturally occurring catalysts for which the process of the instant invention is designed.

Accordingly, it is the principal object of the present invention to provide a process for regenerating a spent naturally occurring catalyst which has been poisoned and deactivated by the deposition of carbon and metals.

It is a particular object of the present invention to provide a process as aforesaid wherein the naturally occurring catalyst is characterized by an iron content of about 10 to 70 wt.% as metal.

It is a further object of the present invention to provide a process as aforesaid wherein the regenerated catalyst has physical properties comparable to the fresh naturally occurring catalyst.

It is a still further object of the present invention to provide a process as aforesaid which is efficient and economical for use in regenerating naturally occurring catalysts.

Further objects and advantages of the present invention will appear hereinbelow.

SUMMARY OF THE INVENTION

In accordance with the present invention the foregoing objects and advantages are readily obtained.

The present invention is drawn to an improved process for regenerating a spent naturally occurring catalyst characterized by an iron content of about 10 to 70 wt.% as a metal. The naturally occurring materials of these catalysts include iron laterite, limonite and red mud. The naturally occuring catalysts are used in the hydroconversion of heavy hydrocarbon feedstocks and as a result become poisoned and deactivated by the deposition thereon of carbon and metals. The process of the present invention comprises contacting the spent catalyst with a mixture of water vapor and air in a water vapor/air ratio of between 1:1 to 20:1 under the following conditions: flow rate of about 0.1 to 50 l/m, temperature of about 200° to 700° C., pressure of about 0.3 to 80 atmospheres for a period of time of about between 0.1 to 20 hours. The processing conditions as set forth above are controlled so as to obtain a regenerated catalyst having a crystallinity (as will be defined hereinbelow) of between 1.0 to 6.5 and physical properties in the regenerated catalyst which are comparable to a fresh catalyst. The mixture of water vapor and air may include a diluent gas selected from the group consisting of $N_2$, $CO_2$, $H_2$, $H_2S$, CO, $CH_4$, $SO_2$ and $O_2$ and mixtures thereof. The regeneration process may be carried out in a fixed bed reactor, fluidized bed reactor, circulating fluidized bed or moving bed reactor. The catalyst may be in the form of powder, pellets, extrudates and granules. The catalyst processed in accordance with the present invention should have a final carbon content of between 1 to 15 wt.% (referred to as a partially regenerated catalyst) and preferably a final carbon content of less than 1 wt.% (referred to as a regenerated catalyst).

The process of the present invention is capable of regenerating naturally occurring catalysts to a degree of catalyst activity comparable to a fresh natural catalyst.

BRIEF DESCRIPTION OF THE DRAWINGS

The FIGURE illustrates the effect of crystallinity on catalyst activity.

DETAILED DESCRIPTION

The process of the present invention is designed for the regeneration of a spent catalyst formed from a naturally occurring material. Suitable naturally occurring materials from which the catalyst is formed include iron laterite, limonite and red mud. The naturally occurring catalyst is characterized by an iron content of from about 10 to 70 wt.% as metal. The fresh catalyst is used in the hydroconversion of heavy hydrocarbon feedstocks characterized by high sulphur and metal contents. The catalysts during the hydroconversion of the heavy hydrocarbon are poisoned and deactivated by the deposition thereon of carbon and metals. The spent naturally occurring catalyst to be regenerated by the process of the present invention, as noted above, is an iron base catalyst which contains coke, iron oxides and/or sulphides and minor amounts of aluminum oxides and/or sulphides, silicon, titanium, sodium, vanadium and nickel. The spent catalyst contains a coke and sulphur content of about 1 to 100 wt.% of the total fresh catalyst weight and, as noted above, an iron content of between 10 to 75 wt.%. Aluminum, silicon and sodium contents as metals are about 1 to 30 wt.% each. Titanium, vanadium and nickel are present in an amount of about 0.1 to 15 wt.% each as metals. The spent catalyst can also contain sulphides and/or oxides of calcium, potassium, zinc, zirconium, galium, copper, magnesium, chromium, manganese, cobalt, molybdenum and phosphorus yielding a metal content of these elements of about 1 to 10,000 ppm of total catalyst weight.

The regeneration process of the present invention comprises contacting the spent catalyst with a mixture of water vapor and air in a water vapor/air ratio of between 1:1 to 20:1 at a flow rate of about 0.1 to 50 l/m, a temperature of about 200° to 700° C., a pressure of about 0.3 to 80 atmospheres for a time of about 0.1 to 20 hours. The oxygen in the air is the active gas for burning the coke in the process. The gas mixture can also contain additional oxygen in an amount of about 0.5 to 30%. In addition, other gases can be used as diluent gases in the water vapor/air or air oxygen mixture. The diluent gases are used to control the combustion rate. These gases include $N_2$, $CO_2$, $H_2$, $H_2S$, CO, $CH_4$, $SO_2$ and $O_2$. The concentration of these gases is dependent on the regeneration conditions. In accordance with the present invention the regeneration time is dependent on the temperature of the reaction, the type of catalyst bed and the chemical nature and flow rate of the gas mixture. An increase in temperature and flow rate results in shorter regeneration times. The regenerated catalyst should contain less than 1 wt.% carbon and the physical properties of the regenerated catalyst should be comparable to those of a fresh catalyst and at the very least should not differ from 30% when compared to a fresh catalyst. The chemical composition of the regenerated catalyst, as will be shown from the following examples, is similar to that of the fresh catalyst except that the vanadium and nickel contents increase with each run through the hydroconversion reactor and consecutive regeneration step.

It is critical in the regeneration process of the present invention for the iron oxide based spent catalyst that the processing conditions be tailored so as to provide a ratio of the crystallinity of the regenerated catalyst to that of a fresh catalyst of between 1.0 to 6.5. For the purposes of the present invention, crystallinity is defined as follows. The relative intensity of the diffracted lines having the Miller (hkl) indices equal to 104, 110, 116 and 012 of the regenerated catalyst would be ratioed to the corresponding one of the fresh catalyst calcined at 400° C. The crystallinity will be the average value of the four ratios obtained. Thus, if the relative intensity of the diffracted line i of the regenerated catalyst as $I_i^r$ and that of the fresh catalyst as $I_i^f$, the crystallinity could be obtained from the average of the following ratios evaluated for each i-line where i stands for the hkl indexes already defined, i.e., i stands for 104, 110, 116 and 012:

$$\text{Crystallinity} = \text{Average of } (I_i^r / I_i^f)$$

where i = 104, 110, 116 and 012.

As noted above, the process of the present invention results in a catalyst which contains a carbon content of from 1 to 15 wt.%, preferably a total carbon content of less than 1 wt.%. In addition, the physical properties of the regenerated catalyst should not differ by more than 30% when compared to a fresh catalyst.

Details of the present invention will be made clear from the following examples.

EXAMPLE 1

Table I sets forth the chemical properties of five spent catalysts formed from a naturally occurring material to be regenerated by the process of the present invention. The spent catalysts are identified as Catalysts I, II, III, IV and V. The chemical properties of a fresh catalyst identified as Catalyst VI are likewise set forth in Table I.

TABLE I

| CHEMICAL PROPERTIES | | | | | | |
|---|---|---|---|---|---|---|
| | CATALYSTS | | | | | |
| | I | II | III | IV | V | VI |
| Type of Material | LF | LF | LM | LM | RM | LM |
| Iron (% w) | 13.7 | 13.8 | 41.1 | 41.0 | 15.8 | 65.2 |
| Particle diameter (mm) | 1.4–2 | 1.4–2 | 1.4–2 | 1.4–2 | 1.4–2 | .0025 (ave.) |
| Carbon on spent Catalysts (% w) | 32.1 | 31.7 | 32.4 | 31.9 | 37.9 | — |
| Sulphur on spent catalysts (% w) | 24.8 | 25.6 | 25.4 | 26.0 | 10.0 | — |
| Vanadium on spent catalysts (% w) | 1.1 | 1.0 | 1.0 | 1.1 | 1.2 | — |

LF = Iron Laterite, LM = Limonite, RM = Red Mud

The five spent catalysts identified in Table I were regenerated in accordance with the process of the present invention under the regeneration conditions set forth in Table II.

TABLE II

REGENERATION CONDITIONS

| | CATALYSTS | | | | | |
|---|---|---|---|---|---|---|
| | I | II | III | IV | V | VI |
| Pressure (psig) | 5 | 5 | 5 | 5 | 5 | — |
| Temperature (°C.) | 500 | 700 | 500 | 700 | 500 | — |
| Water Vapor/Air (mol ratio) | 5.8 | 6.0 | 6.3 | 6.1 | 5.9 | — |
| Time | 6 | 3 | 6 | 3 | 6 | — |

Table III below sets forth the carbon and sulphur contents of the five catalysts regenerated above.

TABLE III

CHEMICAL PROPERTIES OF REGENERATED CATALYSTS

| | CATALYSTS | | | | | |
|---|---|---|---|---|---|---|
| | I | II | III | IV | V | VI |
| Carbon on Regenerated Catalyst (% w) | 0.5 | 0.8 | 0.7 | 1.3 | 2.3 | — |
| Sulfur on Regenerated Catalyst (% w) | 1.2 | 1.5 | 1.4 | 1.8 | 0.3 | — |

The physical properties of the regenerated catalysts and the fresh catalyst VI are set forth in Table IV.

TABLE IV

PHYSICAL PROPERTIES OF REGENERATED CATALYSTS

| | CATALYSTS | | | | | |
|---|---|---|---|---|---|---|
| | I | II | III | IV | V | VI |
| Surface Area (m$^2$/g$^{-1}$) | 40 | 45 | 36 | 34 | 38 | 56 |
| Pore Volume (cc/g$^{-1}$) | 0.55 | 0.50 | 0.49 | 0.45 | 0.51 | 0.72 |
| Crystallinity | 1.5 | 1.3 | 1.4 | 1.6 | 1.8 | — |

In order to determine the catalytic activity of the regenerated catalysts as compared to the fresh catalyst, the catalysts were used in the hydroconversion of a Zuata vacuum residual (950° F.+) having the properties set forth in Table V.

TABLE V

PROPERTIES OF ZUATA VACUUM RESIDUE

| | |
|---|---|
| API Gravity | 2.0 |
| Sulphur (% w) | 4.3 |
| Asphaltene (% w) | 21.2 |
| Conradson Carbon (% w) | 25.5 |
| Vanadium (ppm) | 774 |

The Zuata vacuum residue was subject to hydroconversion under the operating conditions set forth in Table VI.

TABLE VI

HYDROCONVERSION OPERATING CONDITIONS

| | |
|---|---|
| Feed Weight (g) | 1300 |
| Temperature (°C.) | 450 |
| Pressure, psig | 1900 |
| Residence Time | 3 |
| Catalyst/Feed Ratio (% w) | 8 |
| Stirring Rate | 900 |
| H$_2$ Feed Ratio (Feet$^3$ b$^{-1}$) | 1000 |

The activities of the five regenerated catalysts and the fresh catalyst are set forth below in Table VII.

TABLE VII

ACTIVITY

| | CATALYSTS | | | | | |
|---|---|---|---|---|---|---|
| | I | II | III | IV | V | VI |
| Gas Yield (% w) | 13.0 | 13.4 | 12.8 | 13.2 | 18.6 | 13.4 |
| Coke Yield (% w) | 3.2 | 3.4 | 3.4 | 3.6 | 3.5 | 2.9 |
| Liquid Yield (C$_5$+), (% w) | 83.8 | 83.2 | 83.8 | 83.2 | 77.9 | 83.7 |
| API Gravity | 27.5 | 27.8 | 28.8 | 29.0 | 27.9 | 27.4 |
| HDM | 98 | 98 | 98 | 98 | 98 | 98 |
| Asphaltene Conversion | 90 | 91 | 91 | 92 | 89 | 92 |
| Conradson Carbon Conversion | 88 | 89 | 88 | 90 | 87 | 89 |

As can be seen from Table VII, the activities of the regenerated catalysts are excellent when compared to the fresh catalyst. In addition, as can be seen from Table IV the physical properties of the regenerated catalysts are comparable to that of the fresh catalyst. Likewise, as can be seen from Table III the carbon content of the regenerated catalysts and partially regenerated catalysts is greatly reduced.

EXAMPLE 2

Table VIII sets forth the physical and chemical properties of the fresh catalyst No. 6 as well as two spent catalysts, identified as Catalysts 7 and 8 and two regenerated catalysts identified as Catalysts 9 and 10.

TABLE VIII

PHYSICAL AND CHEMICAL PROPERTIES AND REGENERATION CONDITIONS

| | CATALYSTS | | | | |
|---|---|---|---|---|---|
| | VI | VII | VIII | IX | X |
| Properties | | | | | |
| Surface Area (m$^2$ g$^{-1}$) | 56 | 5 | 4 | 46 | 14 |
| Pore Volume (cc g$^{-1}$) | 0.72 | 0.60 | 0.66 | 0.55 | 0.27 |
| Type of Material | LM | LM | LM | LM | LM |
| Iron (% w) | 65.2 | 40.8 | 37.2 | 63.2 | 63.9 |
| Carbon (% w) | — | 28.2 | 36.9 | 0.6 | 0.5 |
| Sulphur (% w) | — | 23.5 | 18.5 | 1.3 | 0.3 |
| Vanadium (% w) | — | 0.74 | 0.65 | 0.9 | 1.0 |
| Crystallinity | 1 | | | 3.5 | 7.54 |
| Regeneration Conditions | | | | | |
| Pressure (psig) | | | | 5 | 5 |
| Temperature (°C.) | | | | 400 | 900 |
| Water Vapor/Air (Mol Ratio) | | | | 6.3 | 6.3 |
| Time (h) | | | | 9 | 1 |

LM = Limonite

Catalyst VII corresponds to a spent catalyst having a single hydroconversion cycle treating the feedstock set forth in Table V under the operating conditions of Table VI. Catalyst VIII corresponds to a double operating cycle of the feed of Table V under the operating conditions of Table VI without an intermediate regeneration. It can be seen from Table VIII that the surface area of these catalysts have been significantly decreased. This is mainly due to the high coke content of the spent catalysts. Table VIII also shows the properties of regenerated Catalysts IX and X. Catalyst IX was regenerated under the operating conditions of the present invention while Catalyst X was regenerated under operating conditions not in compliance with the parameters of the process of the present invention. It can be seen from Table VIII that the properties of Catalyst IX (regenerated in accordance with the recommended operating parameters of the process of the present invention) possess superior properties when compared to Catalyst X. In order to compare the activities of Catalysts VI-X, the catalysts were used in the hydroconversion of the feed of Table V under the same operating conditions as set forth in Table VI. The activity data is set forth below in Table IX.

TABLE IX

ACTIVITY OF FRESH, SPENT AND REGENERATED CATALYSTS

| | CATALYSTS | | | | |
|---|---|---|---|---|---|
| | VI | VII | VIII | IX | X |
| Gas Yield (% w) | 13.4 | 15.8 | 19.9 | 12.9 | 18.4 |
| Coke Yield (% w) | 2.9 | 1.0 | 1.9 | 3.0 | 4.8 |
| Liquid Yield (C$_5$+) (% w) | 83.7 | 83.2 | 78.2 | 84.1 | 76.8 |
| API Gravity | 27.4 | 28.8 | 29.7 | 28.0 | 29.8 |
| HDM | 98 | 98 | 98 | 98 | 99 |
| Asphaltene Conversion | 92 | 92 | 93 | 93 | 95 |
| Conradson Carbon Conversion | 89 | 88 | 91 | 90 | 92 |

From Table IX it can be concluded that the spent catalysts lose their activity upon successive operating cycles as no intermediate regeneration is practiced. The results also show that the catalyst regenerated in accordance with the process of the present invention restores to the regenerated catalyst an activity to that of a fresh catalyst. Furthermore, it can be seen that a catalyst which is regenerated under conditions outside of those of the process of the present invention do not obtain activity levels comparable with a fresh catalyst. The decreased activity is evidenced in Table IX by the decrease in liquid yields and the increase in gas yield and deposited coke. In addition to the foregoing, it can be seen from Table VIII that the catalyst which was regenerated outside of the teachings of the present invention underwent severe changes in physical properties such as pore volume and particle density and also in its crystallinity. The value of crystallinity is defined as the average of the ratios of the relative intensity of four different reflected lines of the regenerated catalyst to those of the fresh catalyst. The selected lines for this purpose are those corresponding to the planes of Fe$_2$O$_3$ having hkl indices of 104, 110, 116 and 012 which belong to the d-spacing values (in A) of 2.700, 2.519, 1.694 and 3.684.

Table X sets forth four additional catalysts which were regenerated in accordance with the features of the present invention.

TABLE X

PHYSICAL AND CHEMICAL PROPERTIES OF REGENERATED CATALYSTS USED IN SEVERAL CYCLES

| | CATALYSTS | | | |
|---|---|---|---|---|
| | XI | XII | XIII | XIV |
| No. of Regenerations | 2 | 3 | 2 | 3 |
| Conditions | | | | |
| Pressure (psig) | 5 | 5 | 5 | 5 |
| Temperature (°C.) | 500 | 500 | 500 | 500 |
| Water Vapor/Air (Mol/Ratio) | 6.3 | 6.3 | 6.3 | 6.3 |
| Time (h) | 6 | 6 | 6 | 6 |
| Properties | | | | |
| Suface Area (m$^2$/g$^{-1}$) | 43 | 41 | 35 | 37 |
| Pore Volume (cc/g$^{-1}$) | 0.52 | 0.54 | 0.50 | 0.48 |

TABLE X-continued

PHYSICAL AND CHEMICAL PROPERTIES OF REGENERATED CATALYSTS USED IN SEVERAL CYCLES

| | CATALYSTS | | | |
|---|---|---|---|---|
| | XI | XII | XIII | XIV |
| Type of Material | LF | LF | LM | LM |
| Iron (% w) | 39.1 | 38.7 | 62.1 | 60.9 |
| Carbon (% w) | 0.9 | 0.5 | 0.9 | 0.8 |
| Sulphur (% w) | 1.2 | 0.8 | 1.0 | 1.5 |
| Vanadium (% w) | 2.4 | 3.8 | 2.5 | 3.9 |
| Crystallinity | 2.0 | 2.1 | 1.8 | 1.9 |

LF = Iron Laterite; LM = Limonite

Table X shows the physical and chemical properties of the catalysts which have been subjected to a number of hydroconversion cycles processing the feed of Table V under the operating conditions of Table VI. The number of cycles are set forth in Table X. The catalysts were subjected to intermediate regenerations in accordance with the process of the present invention between each cycle under the conditions set forth in Table X. Table X shows that a continuous deposition of metals took place on the catalysts during each operating cycle. However, as can be seen from Table XI the regenerated catalysts maintained activities similar to those of the fresh Catalyst VI.

TABLE XI

ACTIVITY OF REGENERATED CATALYSTS USED IN SEVERAL CYCLES

| | CATALYSTS | | | |
|---|---|---|---|---|
| | XI | XII | XIII | XIV |
| Gas Yield (% w) | 13.2 | 13.5 | 13.6 | 13.3 |
| Coke Yield (% w) | 3.2 | 3.5 | 3.0 | 3.4 |
| Liquid Yield (% w) | 83.6 | 83.0 | 83.4 | 83.3 |
| API Gravity | 28.0 | 27.9 | 28.3 | 27.7 |
| HDM | 98 | 99 | 98 | 98 |
| Asphaltene Conversion | 93 | 93 | 92 | 93 |
| Conradson Carbon Conversion (% w) | 89 | 90 | 90 | 91 |

From the foregoing results, it is clearly evident that the regenerated and partially regenerated catalysts regenerated with the process of the present invention behave in a manner similar to that of a fresh catalyst.

EXAMPLE 3

A long term test was designed involving recycling regenerated catalysts in a regenerated catalyst/fresh catalyst ratio of 1.5. Initially only fresh catalyst was used, and then it was withdrawn and replaced from the mentioned make up mixture. The vanadium content increased from 0.1 to 1.1% w. The feed was a Jobo-Morichal crude whose properties are set forth in Table XII.

TABLE XII

| PROPERTIES OF JOBO-MORICHAL CRUDE | |
|---|---|
| API Gravity | 11.5 |
| Sulphur (% w) | 2.8 |
| Asphaltene (% w) | 9.45 |
| Conradson Carbon (% w) | 10.62 |
| Vanadium (ppm) | 317 |

After the first cycle using only fresh catalyst, the obtained product had the following properties as set forth in Table XIII.

TABLE XIII

| | |
|---|---|
| API Gravity | 18.2 |
| Sulphur (% w) | 1.8 |
| Asphaltene (% w) | 3.8 |
| Conradson Carbon (% w) | 6.0 |
| Vanadium (ppm) | 80 |

After 34 operating days and 5 regenerating cycles, the obtained product had the following properties set forth in Table XIV.

TABLE XIV

| | |
|---|---|
| API Gravity | 20 |
| Sulphur (% w) | 1.8 |
| Asphaltene (% w) | 2 |
| Conradson Carbon (% w) | 4 |
| Vanadium (ppm) | 50 |

The catalyst was a ferruginous laterite, and the regeneration was carried out at 500° C., 5 psig during 6 hours, using steam/air molar ratio equal to 6.3. The carbon and sulfur content after each regeneration cycle was similar to those already shown in Table III. The physical properties of the regenerated catalysts were also similar to those of the regenerated catalysts of Table IV.

EXAMPLE 4

700 g of spent catalyst in the form of pellets were regenerated at different temperatures during different periods of time as specified in Table XV. The maximum temperature achieved, was controlled by varying the water vapor/air ratio. The water flow rate was kept constant at 20 cc min.$^{-1}$ while the air flow rate was varied from 2.0 to 6.0 l min$^{-1}$. The physical properties and the C, S and V content of the regenerated catalysts together with their catalytic activity and their crystallinity are also shown in Table XV. The FIGURE illustrates the change in activity with crystallinity. As we can see crystallinity increases with increasing regeneration temperature and also activity decreases. Temperatures above 700° C. produce regenerated catalyst too crystalline to have good activity.

TABLE XV
REGENERATION IN A FIXED BED REACTOR

| Conditions | | Catalyst Properties | | | | | | Activity | | |
|---|---|---|---|---|---|---|---|---|---|---|
| Temp. (°C.) | Time (h) | Surface Area (m² g$^{-1}$) | Pore Volume (cc g$^{-1}$) | C (% w) | S (% w) | V (% w) | Crystallinity | Gas Yield (% w) | Liquid Yield (% w) | C. Cat. (% w) |
| 535 | 9 | 13.4 | 1.1 | 0.1 | 0.3 | 1.97 | 3.1 | 13.9 | 81.0 | 36.5 |
| 560 | 5 | 12.5 | 1.0 | 5.6 | 4.0 | 1.96 | 3.6 | 13.8 | 81.8 | 36.0 |
| 665 | 7 | 8.3 | 1.0 | 0.1 | 0.5 | 1.96 | 4.9 | 13.8 | 81.4 | 36.7 |
| 720 | 5 | 3.3 | 1.1 | 0.1 | 0.8 | 2.02 | 6.0 | 14.6 | 79.6 | 39.5 |
| 812 | 3 | 3.0 | 1.2 | 0.1 | 0.5 | 1.96 | 5.6 | 14.2 | 80.0 | 39.3 |
| LM* | | 56 | 0.72 | | | | | 12.3 | 82.2 | 38.3 |

*Fresh Catalyst

EXAMPLE 5

A batch of spent catalyst of a particle size between 150 and 500 m was fluidized in a reactor at 150° C. by using a vacuum pump. The catalyst was regenerated at the conditions specified in Table XVI. The crystallinity of the regenerated catalyst and its catalytic activity are also shown in Table XVI. The R3 catalyst was only partially regenerated but its catalytic activity could be considered significant. As we could see the activity increases with increasing crystallinity and also the closer the crystallinity value to 1.0 the regenerated catalyst recovered the most its catalytic activity.

TABLE XVI
REGENERATION IN A FLUIDIZED BED REACTOR

| Conditions | | | | |
|---|---|---|---|---|
| Temperature (°C.) | | | | 500–560 |
| Time (h) | | | | 5–7 |
| Water Vapor/Air (Mol Ratio) | | | | 4.0–6.0 |

| Catalyst Properties and Activity | | | | |
|---|---|---|---|---|
| | LM | R1 | R2 | R3 |
| Crystallinity | 1.0 | 1.4 | 1.6 | * |
| Gas Yield (% w) | 12.3 | 13.6 | 13.6 | 16.6 |
| Liquid Yield (% w) | 82.2 | 82.3 | 81.4 | 78.9 |
| Carbon Conradson Conversion | 83.5 | 87.0 | 86.0 | 89.0 |
| Distillates | 692 | 698 | 691 | 656 |

*Partially Regenerated Catalyst

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for regenerating a spent, naturally occurring catalyst characterized by an iron content of about 10 to 70 wt.% as metal, said catalyst having been poisoned and deactivated by the deposition thereon of carbon and metals as a result of the hydroconversion of heavy hydrocarbon feedstocks with said catalyst comprising contacting said spent catalyst with a mixture of water vapor and air in a water vapor/air ratio of between 1:1 to 20:1 under the following conditions:

| | |
|---|---|
| Flow Rate of Water Vapor/Air Mixture, l/min. | 0.1–50.0 |
| Temperature | 200–700 |
| Pressure, atms. | 0.3–80 |
| Time, hrs. | 0.1–20 | so as to obtain a regenerated catalyst having a final carbon content of not more than 15 wt.% and crystallinity value of between 1.0 to 6.5 where crystallinity is defined as follows:

Crystallinity = Average of $(I_i^r/I_i^f)$ where
i = 104, 110, 116 and 012 are Miller indices
wherein the physical properties of said regenerated catalyst are comparable to a fresh catalyst.

2. The method of claim 1 wherein the regenerated catalyst contains a final amount of carbon less than 1.0 wt.%.

3. The method of claim 1 wherein the said water vapor/air mixture corresponds to a ratio between 1:1 to 20:1 during a time in the range of 0.1 to 20 hours.

4. The method of claim 1 wherein the said ratio water vapor/air is in the range of 5:1 to 16:1 during a time in the range of 1 to 8 hours.

5. The method of claim 1 wherein the said water vapor/air ratio is in the range of 9:1 and 11:1 during a time in the range of 2 to 6 hours.

6. The method of claim 1 wherein regeneration is carried out in a fixed bed reactor.

7. The method of claim 1 wherein regeneration is carried out in a fluidized bed reactor.

8. The method of claim 1 wherein regeneration is carried out in a circulating fluidized bed.

9. The method of claim 1 wherein regeneration is carried out in a moving bed.

10. The method of claim 1 wherein the catalyst to be regenerated is a powder.

11. The method of claim 1 wherein the catalyst to be regenerated is in the form of pellets.

12. The method of claim 1 wherein the catalyst to be regenerated is in the form of extrudates.

13. The method of claim 1 wherein the catalyst to be regenerated is in the form of granules.

* * * * *